United States Patent
Sakhnini et al.

(10) Patent No.: US 11,956,791 B2
(45) Date of Patent: Apr. 9, 2024

(54) COVERAGE ENHANCEMENTS FOR PHYSICAL DOWNLINK CONTROL CHANNEL (PDCCH) AND PHYSICAL DOWNLINK SHARED CHANNEL (PDSCH)

(71) Applicant: QUALCOMM Incorporated, San Diego, CA (US)

(72) Inventors: Iyab Issam Sakhnini, San Diego, CA (US); Tao Luo, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/157,923

(22) Filed: Jan. 25, 2021

(65) Prior Publication Data
US 2022/0240290 A1    Jul. 28, 2022

(51) Int. Cl.
*H04W 72/23* (2023.01)
*H04W 56/00* (2009.01)
*H04W 72/30* (2023.01)

(52) U.S. Cl.
CPC .......... *H04W 72/23* (2023.01); *H04W 72/30* (2023.01); *H04W 56/001* (2013.01)

(58) Field of Classification Search
CPC .... H04W 56/001; H04W 48/12; H04W 72/12
See application file for complete search history.

(56) References Cited

U.S. PATENT DOCUMENTS

| | | | | |
|---|---|---|---|---|
| 2014/0286277 A1* | 9/2014 | Jang | ...................... | H04L 5/0048 370/329 |
| 2018/0324843 A1* | 11/2018 | Lee | ........................ | H04W 48/12 |
| 2019/0141693 A1* | 5/2019 | Guo | ........................ | H04W 16/14 |
| 2019/0229792 A1* | 7/2019 | John Wilson | ........ | H04W 72/046 |
| 2019/0239093 A1* | 8/2019 | Zhang | ...................... | H04L 5/001 |
| 2019/0239212 A1* | 8/2019 | Wang | .................... | H04L 5/0051 |
| 2019/0349059 A1* | 11/2019 | John Wilson | ......... | H04L 5/0091 |
| 2019/0379506 A1* | 12/2019 | Cheng | .................. | H04L 1/0038 |

(Continued)

FOREIGN PATENT DOCUMENTS

WO    WO-2020122686 A1 *  6/2020  ........... H04L 1/1819

OTHER PUBLICATIONS

3GPP TS 38.213: "3rd Generation Partnership Project; Technical Specification Group Radio Access Network; NR; Physical Layer Procedures for Control (Release 15)", 3GPP Standard; Technical Specification; 3rd Generation Partnership Project (3GPP), Mobile Competence Centre; 650, Route Des Lucioles; F-06921 Sophia-Antipolis Cedex; France, vol. RAN WG1, No. V15.1.0, Apr. 8, 2018, pp. 1-77, XP051451088, [retrieved on Apr. 8, 2018] section 1 "Scope" section 8 "Random Access Procedure", p. 60, paragraph 11.1.1, paragraph [0013].

(Continued)

*Primary Examiner* — Yee F Lam
(74) *Attorney, Agent, or Firm* — Arun Swain

(57) ABSTRACT

A method for wireless communication performed by a user equipment (UE) includes receiving a physical broadcast channel (PBCH). The method also includes receiving a number of control resource sets (CORESETS) based on the received PBCH. The method further includes receiving one or more physical downlink shared channels (PDSCHs) based on receiving the number of CORESETS.

40 Claims, 9 Drawing Sheets

(56) References Cited

U.S. PATENT DOCUMENTS

| | | | | |
|---|---|---|---|---|
| 2020/0045569 | A1* | 2/2020 | Seo | H04L 5/0053 |
| 2020/0045709 | A1* | 2/2020 | Seo | H04W 72/53 |
| 2020/0052844 | A1* | 2/2020 | Yu | H04L 5/0053 |
| 2020/0196306 | A1* | 6/2020 | Si | H04L 5/0048 |
| 2020/0221428 | A1* | 7/2020 | Moon | H04L 1/1854 |
| 2020/0288479 | A1* | 9/2020 | Xi | H04W 72/042 |
| 2020/0314776 | A1* | 10/2020 | Harada | H04W 72/12 |
| 2020/0351896 | A1 | 11/2020 | Taherzadeh Boroujeni et al. | |
| 2020/0404690 | A1* | 12/2020 | Lee | H04L 5/001 |
| 2021/0058906 | A1* | 2/2021 | Seo | H04W 16/28 |
| 2021/0219336 | A1* | 7/2021 | Fan | H04W 74/04 |
| 2021/0274503 | A1* | 9/2021 | Farag | H04W 76/11 |
| 2022/0022237 | A1* | 1/2022 | Kim | H04L 5/0055 |
| 2022/0053544 | A1* | 2/2022 | Kang | H04B 7/088 |
| 2022/0131793 | A1* | 4/2022 | Ramachandra | H04W 36/305 |

OTHER PUBLICATIONS

International Search Report and Written Opinion—PCT/US2021/062246—ISA/EPO—dated Apr. 7, 2022.

3GPP TS 38.213: "3rd Generation Partnership Project; Technical Specification Group Radio Access Network; NR; Physical Layer Procedures for Control (Release 15)", 3GPP Standard; Technical Specification; 3rd Generation Partnership Project (3GPP), Mobile Competence Centre; 650, Route Des Lucioles; F-06921 Sophia-Antipolis Cedex; France, vol. RAN WG1, No. V15.1.0, Apr. 8, 2018, pp. 1-77, XP051451088, [retrieved on Appr. 8, 2018] section 1 "Scope" section 8 "Random Access Procedure", p. 60, paragraph 11.1.1, paragraph [0013].

CATT: "Corrections on Carrier Aggregation and Bandwidth Part Operation", 3GPP Draft, R1-1808381, 3GPP TSG RAN WG1 Meeting #94, 3rd Generation Partnership Project (3GPP), Mobile Competence Centre, 650, Route Des Lucioles, F-06921, Sophia-Antipolis Cedex, France, vol. RAN WG1, Aug. 11, 2018 (Aug. 11, 2018), XP051515763, 14 pages, Retrieved from the Internet: URL: http://www.3gpp.org/ftp/tsg%5Fran/WG1%5FRL1/TSGR1%5F94/Docs/R1%2D1808381%2Ezip, p. 1.

CATT: "Offline Summary for AI 7.1.2.2 Remaining Details on Remaining Minimum System Information", 3GPP Draft, R1-1719033, 3GPP TSG RAN WG1 Meeting 90bis, Offline Summary for AI_7_1_2_2 Remaining Details on RMSI Oct. 11, 3rd Generation Partnership Project (3GPP), Mobile Competence Centre, 650, Route Des Lucioles, F-06921, Sophia-Antipolis Cedex, France, vol. RAN WG1, No. Prague, CZ, Oct. 9-13, 2017, Oct. 12, 2017 (Oct. 12, 2017), XP051353489, 14 Pages, Retrieved from the Internet: URL: http://www.3gpp.org/ftp/tsg_ran/WG1_RL1/TSGR1_90b/Docs/ [retrieved on Oct. 12, 2017] paragraph [02.3]-paragraph [02.7].

CATT: "Summary of Offline Discussion on Remaining Minimum System Information", 3GPP Draft, R1-1721473, 3GPP TSG RAN WG1 Meeting 91, Summary for RMSI Issues, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27-Dec. 1, 2017, Nov. 29, 2017 (Nov. 29, 2017), XP051363996, 29 Pages, Retrieved from the Internet: URL: http://www.3gpp.org/ftp/Meetings%5F3GPP%5FSYNC/RAN1/Docs/ [retrieved on Nov. 29, 2017] p. 5 p. 20, Intel Corporation: "Ultra-Reliability for NR PDCCH", 3GPP Draft, 3GPP TSG RAN WG1 Meeting 91, R1-1720084, Intel—DL Control URLLC, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27-Dec. 1, 2017, Nov. 18, 2017 (Nov. 18, 2017), XP051369765, pp. 1-5, Retrieved from the Internet: URL: http://www.3gpp.org/ftp/tsg%5Fran/WG1%5FRL1/TSGR1%5F91/Docs/. [retrieved on Nov. 18, 2017] section 2.2, paragraph [02.2] figure 1.

International Search Report and Written Opinion—PCT/US2021/062246.

* cited by examiner

COVERAGE ENHANCEMENTS FOR PHYSICAL DOWNLINK CONTROL CHANNEL (PDCCH) AND PHYSICAL DOWNLINK SHARED CHANNEL (PDSCH)

FIELD OF THE DISCLOSURE

Aspects of the present disclosure generally relate to wireless communications, and more particularly to techniques and apparatuses for 5G new radio (NR) coverage enhancements for physical downlink control channels (PDCCHs) and physical downlink shared channels (PDSCHs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method for wireless communication at a UE includes receiving a physical broadcast channel (PBCH). The method further includes receiving a number of control resource sets (CORESETS) based on the received PBCH. The method still further includes receiving one or more physical downlink shared channels (PDSCHs) based on receiving the number of CORESETS.

Another aspect of the present disclosure is directed to an apparatus for wireless communication at a UE. The apparatus includes means for receiving a PBCH. The apparatus further includes means for receiving a number of CORESETS based on the received PBCH. The apparatus still further includes means for receiving one or more PDSCHs based on receiving the number of CORESETS.

In another aspect of the present disclosure, a non-transitory computer-readable medium with non-transitory program code recorded thereon for wireless communication is disclosed. The program code is executed by a processor and includes program code to receive a PBCH. The program code further includes program code to receive a number of CORESETS based on the received PBCH. The program code still further includes program code to receive one or more PDSCHS based on receiving the number of CORESETS.

Another aspect of the present disclosure is directed to an apparatus for wireless communication at a UE. The apparatus includes a processor and memory coupled to the processor. The apparatus also includes instructions stored in the memory and operable, when executed by the processor, to cause the apparatus to receive a PBCH. The instructions further cause the apparatus to receive a number of CORESETS based on the received PBCH. The instructions still further cause the apparatus to receive one or more PDSCHs based on receiving the number of CORESETS.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
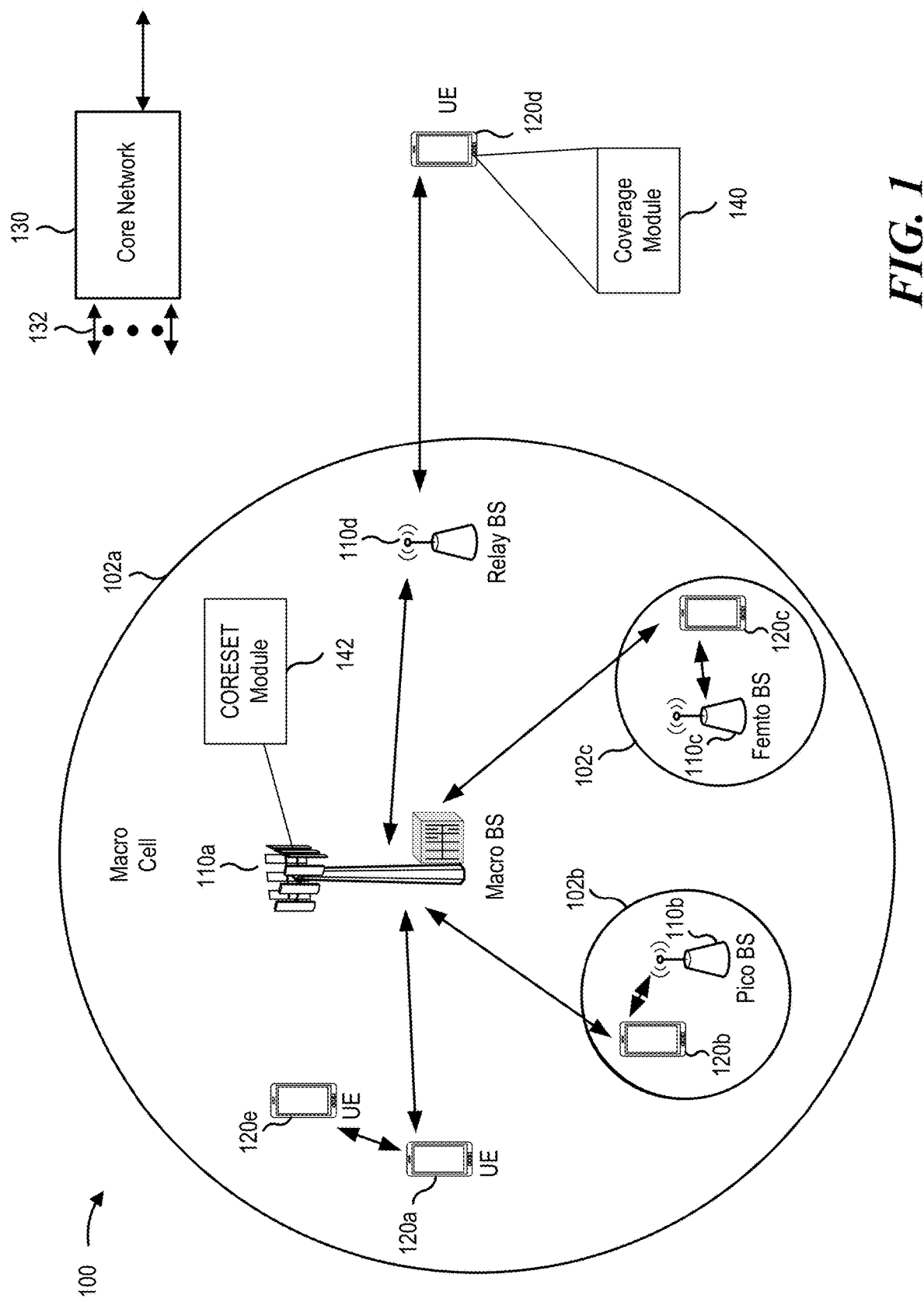
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In some cases, it may be difficult for a UE in low coverage to receive one or more channels, such as a physical broadcast channel (PBCH), a physical downlink control channel (PDCCH), and/or a physical downlink shared channel (PDSCH). It may be desirable to improve coverage and/or improve channel recovery for low coverage UEs. In some cases, multiple PBCHs may be combined to improve reliability and coverage. For example, combining four PBCHs may improve channel strength by approximately six decibels (dBs). A PBCH may schedule a search space location and a control resource set (CORESET) that carries a physical downlink control channel (PDCCH). The search space may be search space 0, and a control resource set (CORESET) may be CORESET0. The PDCCH may include downlink control information (DCI), such as DCI 1_0. The DCI may include a system information—radio network temporary identifier (SI-RNTI). Additionally, the DCI may schedule a system information block (SIB), such as the SIB1, of a PDSCH. Aspects of the present disclosure are directed to improving coverage and improving recovery for the PDCCH, such as a type-0 PDCCH.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a coverage module 140. For brevity, only one UE 120d is shown as including the coverage module 140. The coverage module 140 may receive a physical broadcast channel (PBCH). The coverage module 140 may further receive a number of control resource sets (CORESETS) based on the received PBCH. The coverage module 140 may still further receive one or more physical downlink shared channels (PDSCHs) based on receiving the number of CORESETS.

The base station 110a may include a CORESET module 142. For brevity, only one base station 110a is shown as including the CORESET module 142. The CORESET module 142 may transmit a PBSCH, transmit a number of CORESETS based on the transmitted PBCH, and transmit one or more PDSCHs based on transmitting the number of CORESETS.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
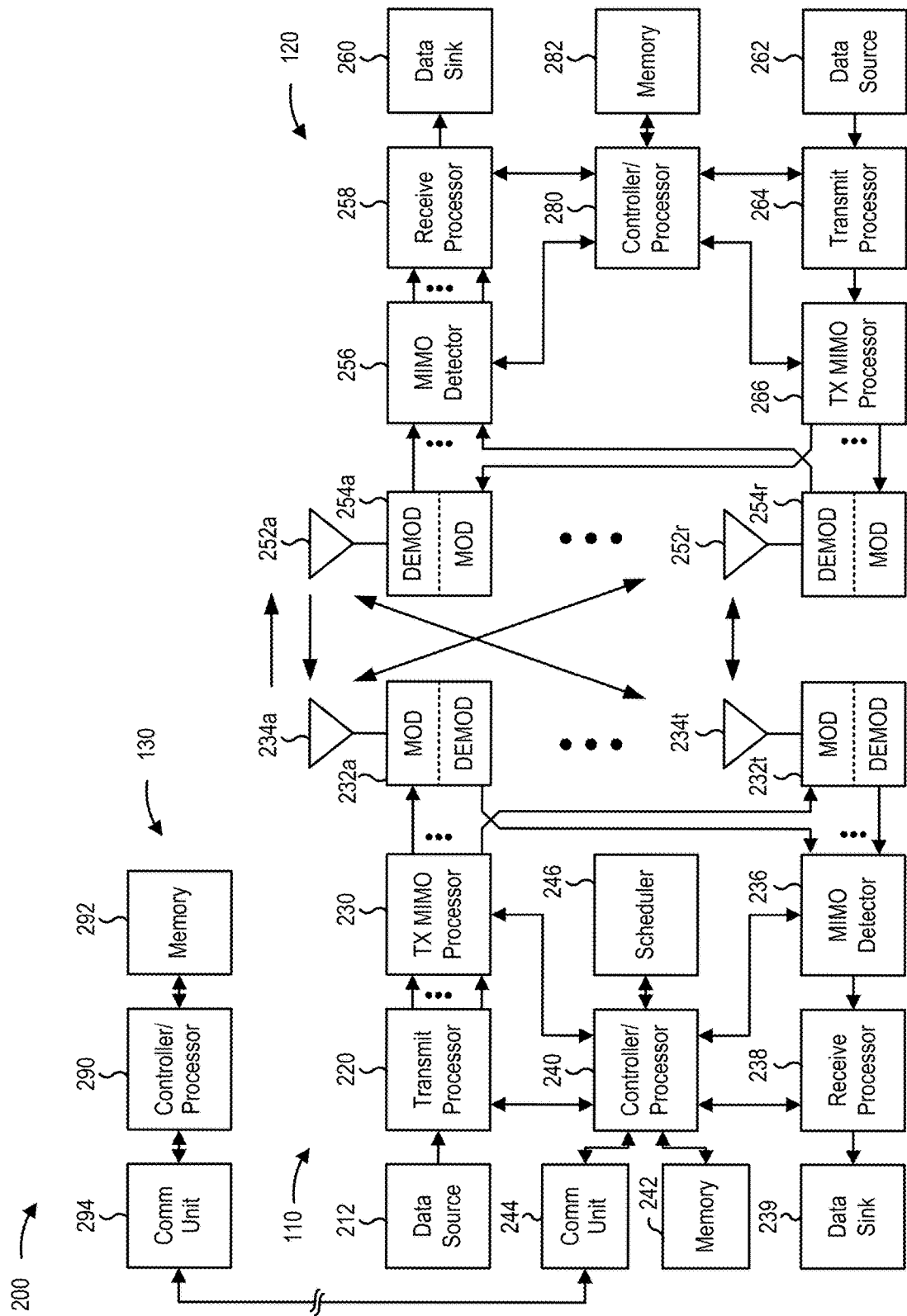
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with combining multiple physical broadcast channels (PBCHs) to improve physical downlink control channel (PDCCH) and physical downlink shared channel (PDSCH) reception as described in more detail elsewhere. For example, the controller/processor 240 of the base station 110, the controller/processor 280 of the UE 120, and/or any other component(s) of FIG. 2 may perform or direct operations of, for example, the process of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving a physical broadcast channel (PBCH); means for receiving a number of control resource sets (CORESETS) based on the received PBCH; and means for receiving one or more physical downlink shared channels (PDSCHs) based on receiving the number of CORESETS. Additionally, the base station 110 may include means for transmitting a PBCH, means for transmitting a number of CORESETS based on the transmitted PBCH, and means for transmitting one or more PDSCHs based on transmitting the number of CORESETS. Such means may include one or more components of the UE 120 or base station 110 described in connection with FIG. 2.

As indicated above, FIG. 2 is provided merely as an example. Other examples may differ from what is described with regard to FIG. 2.

Figure 3:
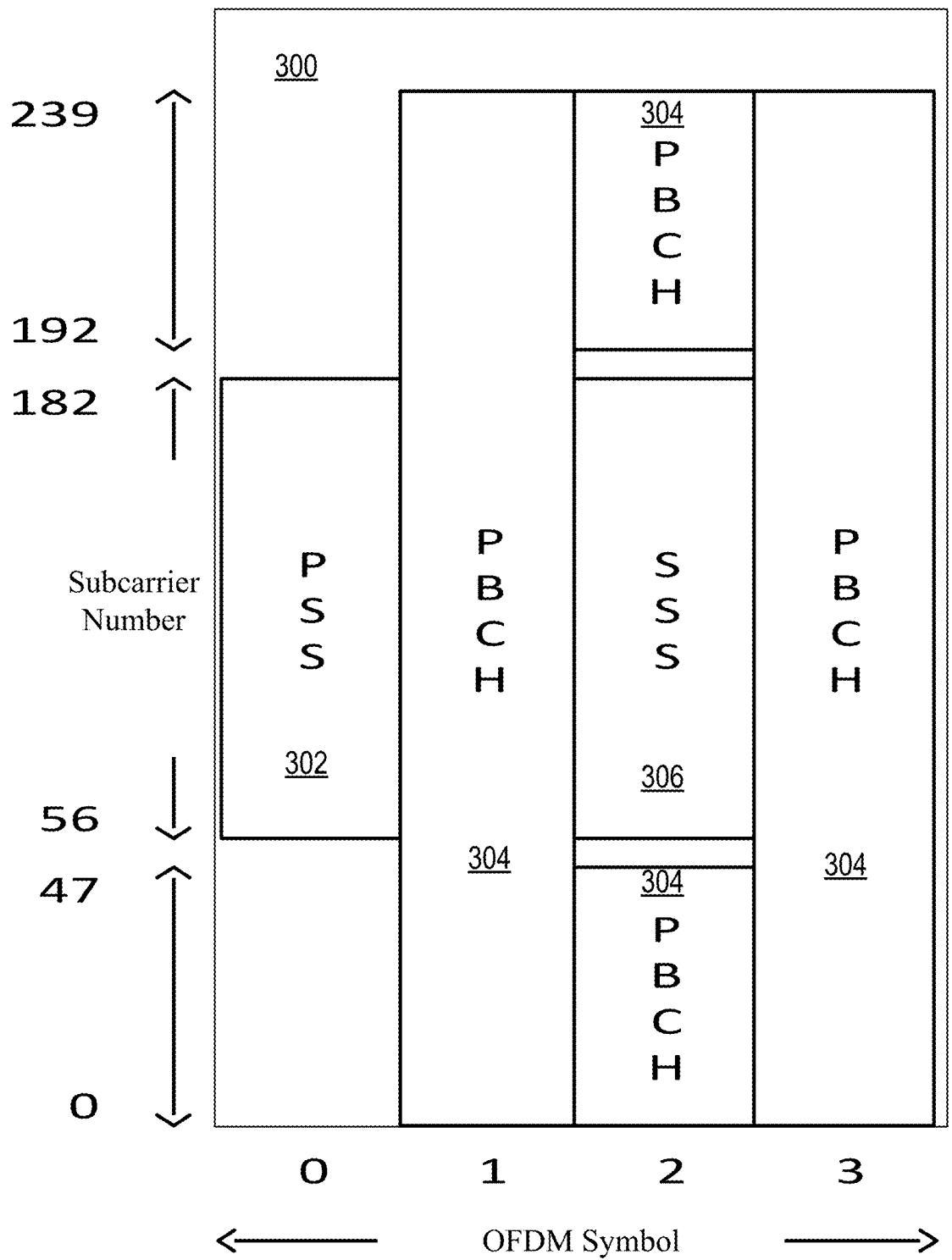
FIG. 3 is a diagram illustrating a synchronized signal block (SSB), in accordance with aspects of the present disclosure.

In 3GPP Release 15 and beyond, a synchronized signal block (SSB) may be used for an initial cell search. The SSB may also be referred to as a synchronization signal (SS) and physical broadcast channel (PBCH) block. FIG. 3 is a block diagram illustrating an example of an SSB 300, in accordance with aspects of the present disclosure. As shown in FIG. 3, the SSB 300 spans four orthogonal frequency division multiplexing (OFDM) symbols (0-3). In the example of FIG. 3, a primary synchronization signal (PSS) 302 may be transmitted on one symbol, a PBCH 304 may be transmitted alone on two different symbols, and a secondary synchronization signal (SSS) 306 and the PBCH 304 may be frequency division multiplexed (FDM'd) on one symbol. In the example of FIG. 3, the PSS 302 and the SSS 306 may be located in central subcarriers (e.g., subcarriers 56 to 182) of a carrier. The PBCH 304 may be transmitted on a full range of subcarriers (e.g., subcarriers 0 to 239) or a subset of subcarriers (e.g., subcarriers 0 to 47 and/or subcarriers 192 to 239).

The PSS 302, SSS 306, and PBCH 304 may be transmitted at different subcarrier spacing (SCS) (e.g., carrier tone intervals) for different frequency ranges. As an example, for frequency range 1 (FR1), the SCS may be 15 kHz or 30 kHz. As another example, for frequency range 2 (FR2), the SCS may be 120 kHz or 240 kHz. The PSS may be generated based on an M-sequence of length 127 in a frequency domain and may have three possible sequences. In one example, the PSS 302 may be mapped to 127 subcarriers (SCs). Additionally, the SSS 306 may be generated based on a Gold Code sequence of length 127 (e.g., two M-sequences) in the frequency domain and may have 1008 possible sequences. The PBCH 304 may be quadrature phase shift keying (QPSK) modulated and may be coherently demodulated using an associated demodulation reference signal (DMRS)

During an initial cell search, a UE may use a sliding window and correlation technique to search for a PSS 302. For each timing hypothesis, the UE may try all three sequences and N frequency hypotheses to account for Doppler, internal clock frequency shifts, and any other frequency errors. As an example, a base station may transmit the PSS 302 and SSS 306, and the UE can synchronize with the base station based on the PSS 302 and SSS 306. In this example, the PSS 302 may enable synchronization of slot timing and may indicate a physical layer identity value. The UE may receive the SSS 306 after receiving the PSS 302. The SSS 306 may enable radio frame synchronization, and may provide a cell identity value, which may be combined with the physical layer identity value to identify the cell. The SSS 306 may also enable detection of a duplexing mode and a cyclic prefix length.

After receiving the PSS 302 and the SSS 306, the UE may receive a master information block (MIB), which may be transmitted in the PBCH 304. The MIB may contain system bandwidth information, a system frame number (SFN), and a physical channel hybrid automatic repeat request (HARD) indicator channel (PHICH) configuration. After decoding the MIB, the UE may receive one or more system information blocks (SIBs). For example, SIB1 may contain cell access parameters and scheduling information for other SIBs. The UE may receive SIB2 after decoding SIB1. SIB2 may contain radio resource control (RRC) configuration information related to random access channel (RACH) procedures, paging, PUCCH, PUSCH, power control, SRS, and cell barring.

In some wireless systems, such as 3GPP Release 15 wireless systems, frequency range 2 (FR2) may use one of three multiplexing patterns for multiplexing a synchronized signal block (SSB) and control resource set 0 (CORESET0). As an example, in a first multiplexing pattern, the SSB and CORESET0 symbols are time division multiplexed (TDM'ed). In a second multiplexing pattern, the SSB and CORESET0 use different subcarrier spacing and are both frequency division multiplexed and time division multiplexed. In a third multiplexing pattern, the SSB and CORESET0 use the same subcarrier spacing and are frequency division multiplexed.

As described, the UE may decode a SIB after decoding a MIB. As an example, the MIB may include a SIB configuration (pdcch-ConfigSIB1), which includes four bits for CORESET0 (controlResourceSetZero). The CORESET0 bits may indicate a multiplexing pattern, a frequency offset, a number of resource blocks, and a number of symbols specified for CORESET0. The SIB configuration may also include four bits dedicated to search space zero (searchSpaceZero). The four bits for search space zero may identify a time location for CORESET0. In most cases, CORESET0 may be one, two, or three symbols long and may occupy 24, 48, or 96 resource blocks (RBs).

In some cases, it may be difficult for a UE in low coverage to receive one or more channels, such as a physical broadcast channel (PBCH), a physical downlink control channel (PDCCH), and/or a physical downlink shared channel (PDSCH). It may be desirable to improve coverage and/or improve channel recovery for low coverage UEs. In some cases, multiple PBCHS may be combined to improve reliability and coverage. For example, combining four PBCHs may improve channel strength by approximately six decibels (dBs). A PBCH may schedule a search space location and a control resource set (CORESET) that carries a physical downlink control channel (PDCCH). The search space may be search space 0 and the CORESET may be CORESET0. The PDCCH may include downlink control information (DCI), such as DCI 1_0. The DCI may include the system information-radio network temporary identifier (SI-RNTI). Additionally, the DCI may schedule a system information block (SIB), such as the SIB1, of a physical downlink shared channel (PDSCH). Aspects of the present disclosure are directed to improving coverage and improving recovery for the PDCCH, such as a type-0 PDCCH. In one configuration, the PDCCH is transmitted on FR2 using the second multiplexing pattern.

According to aspects of the present disclosure, for each beam within a cell, the PBCH may be configured to transmit information identifying multiple occasions of a CORESET. In the examples described below, the CORESET refers to CORESET zero (CORESET0), unless otherwise specified. The multiple occasions of the CORESET may also correspond to a search space and a PDCCH. In one configuration, the UE may combine the multiple CORESETS to improve reception. The CORESET refers to time and frequency resources where a PDCCH may be transmitted. Therefore, combining multiple CORESETS may result in the UE combining multiple PDCCHs, such as type0-PDCCHs.

Figure 4A:
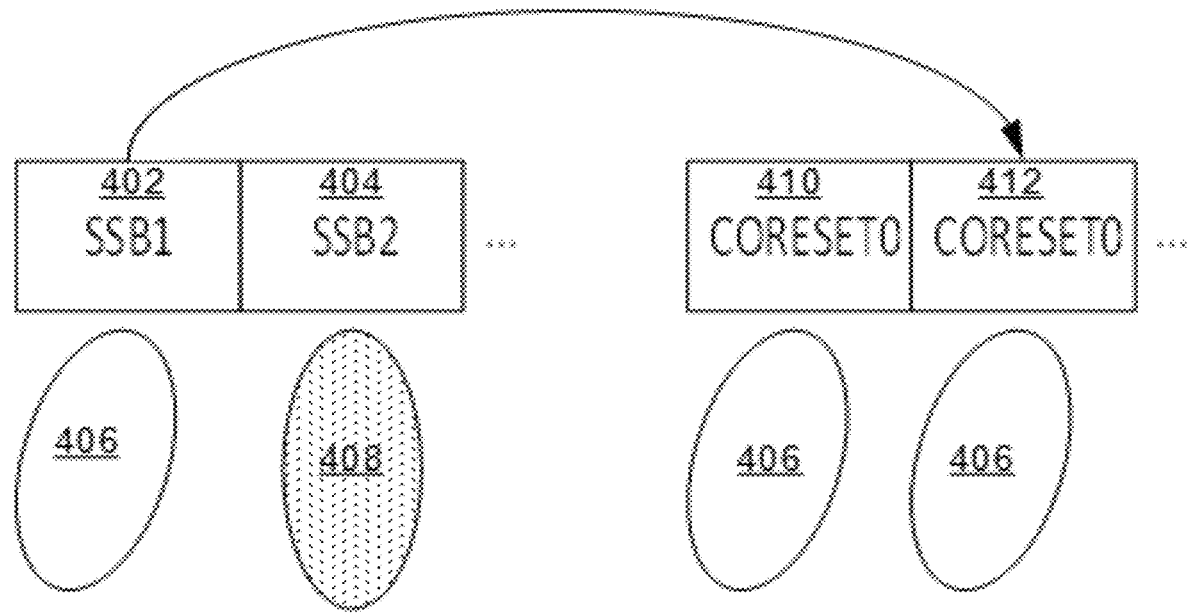
FIGS. 4A and 4B are block diagrams illustrating examples of beams for a control resource set (CORESET), in accordance with aspects of the present disclosure.

The beam for each CORESET may be the same beam as for the SSB or different from the beam of the SSB. FIG. 4A is a diagram illustrating an example of beams for a CORESET, in accordance with aspects of the present disclosure. In the example of FIG. 4A, the UE may receive an SSB 402, 404 on each beam 406, 408 of a cell. As described, each SSB on the beam 406, 408 may identify multiple CORESETS 410, 412. As shown in FIG. 4A, a first SSB (SSB1) 402 may be received on a first beam 406 and a second SSB (SSB2) 404 may be received on a second beam 408. In this example, the CORESETS 410, 412 may be received on the same beam 406 as the first SSB 402. Additionally, the CORESETS 410, 412 may be quasi co-located (QCL'd) with the first SSB 402. For example, the CORESETS 410, 412 may be QCL'd based on spatial parameters, in other words, QCL type D. The CORESETS 410, 412 may also traverse the same beam as the second SSB 404, and may also be QCL'd with the second SSB 404. Aspects of the present disclosure are not limited to receiving two SSBs and two CORESETS, as shown in FIG. 4A, the present disclosure contemplates two or more SSBs and/or two or more CORESETS.

Figure 4B:
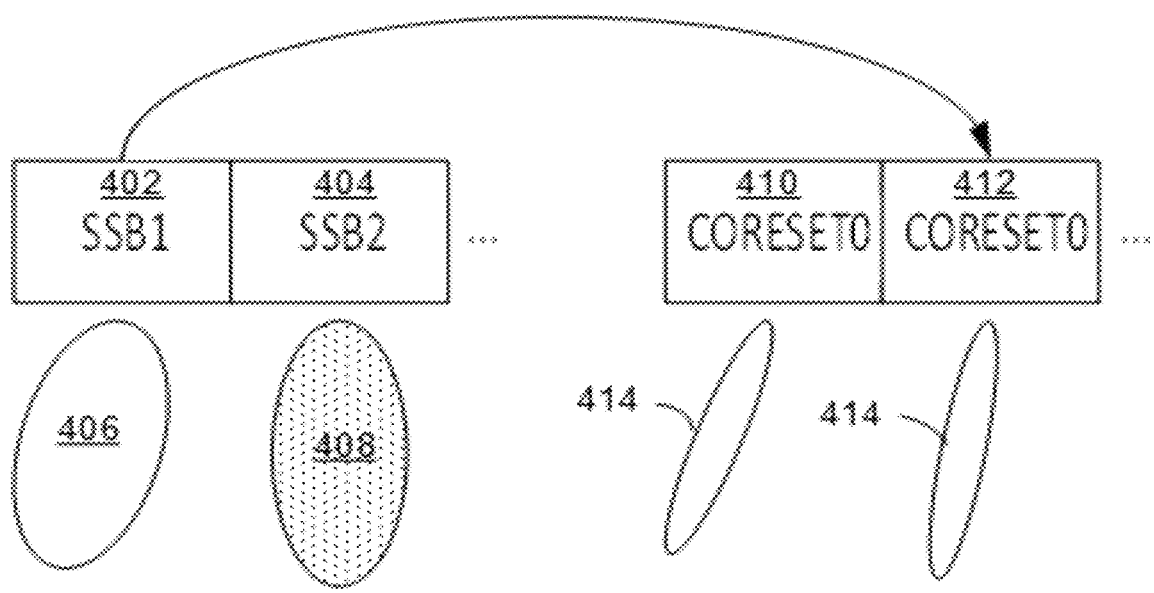

FIG. 4B is a diagram illustrating an example of beams for a CORESET, in accordance with aspects of the present disclosure. In the example of FIG. 4B, the UE may receive an SSB 402, 404 on each beam 406, 408 of a cell. As described, the SSB 402, 404 in each beam 406, 408 of the cell may identify multiple CORESETS 410, 412. As shown in FIG. 4B, the first SSB (SSB1) 402 may be received on the first beam 406 and the second SSB (SSB2) 404 may be received on the second beam 408. In this example, the CORESETS 410, 412 may be received on a third beam 414 that is different from the first beam 406 of the first SSB 402. In this example, the third beam 414 may be narrower (e.g., finer) than the first beam 406. In one configuration, the third beam 414 used for transmitting the CORESET is a sub-beam of the first beam 406 used for transmitting a corresponding SSB, such as the first SSB 402. Additionally, the CORESETS 410, 412 may be QCL'd with the first SSB 402. For example, the CORESETS 410, 412 may be QCL'd based on QCL type D. The CORESETS 410, 412 may also use a different beam (e.g., sub-beam) than the second beam 408.

Figure 5A:
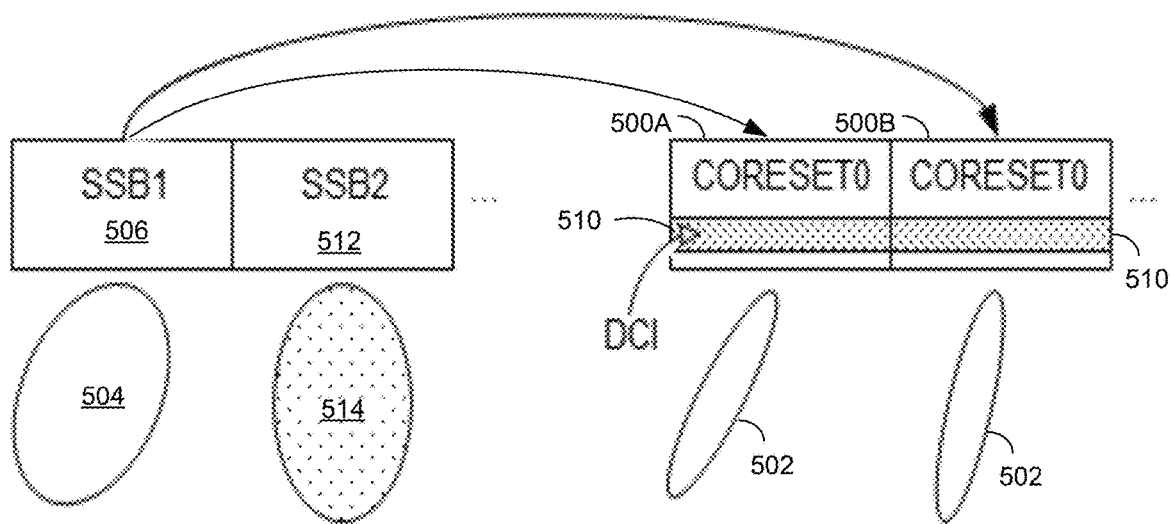
FIGS. 5A and 5B are block diagrams illustrating examples of downlink control information (DCI) transmitted in a CORESET, in accordance with aspects of the present disclosure.
Figure 5B:
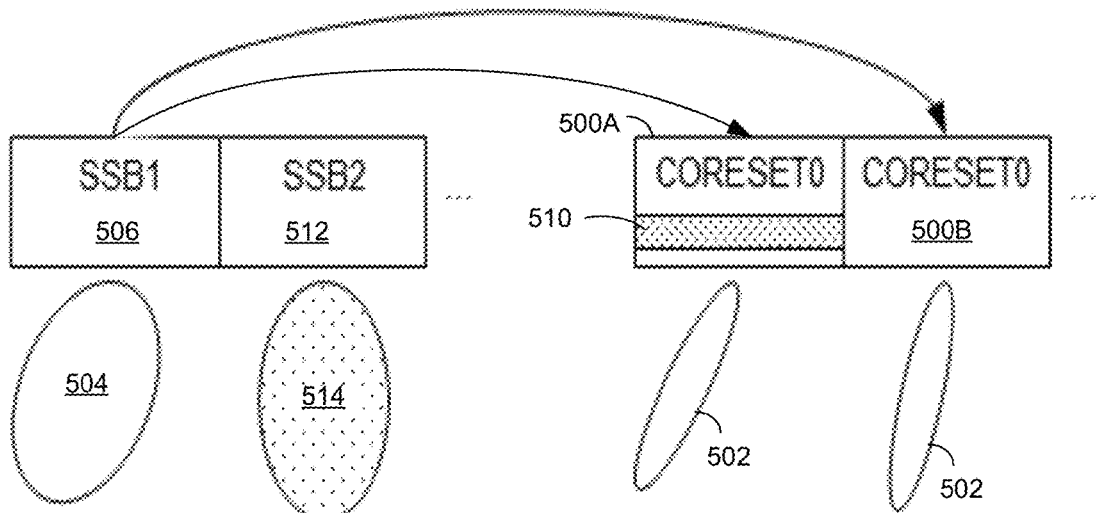

As described, one or more CORESETS (e.g., type0-PDCCHs) may include downlink control information (DCI), such as DCI 1_0. Additionally, the DCI may include a system information-radio network temporary identifier (SI-RNTI). FIGS. 5A and 5B are diagrams illustrating examples of DCI transmitted in a CORESET, in accordance with aspects of the present disclosure. As described, for each beam within a cell, the PBCH may be configured to transmit information identifying multiple occasions of a CORESET 500A, 500B. Additionally, a beam 502 for each CORESET 500A, 500B may be a same beam 504 as for an SSB 506 or different from the beam 504 of the SSB 506. FIGS. 5A and 5B illustrate examples of transmitting each CORESET 500A, 500B on the beam 502 that is different from the beam 504 of the SSB 506, as described with reference to FIG. 4B. Additionally, in the examples of FIGS. 5A and 5B, a second SSB 512 (SSB2) may be transmitted via a corresponding beam 514. The corresponding beam 514 of the second SSB 512 (SSB2) may be different from the beam 504 of the first SSB 506 (SSB1).

In one configuration, as shown in FIG. 5A, DCI 510 is included in a PDCCH transmitted in each CORESET 500A, 500B of the multiple CORESETS 500A, 500B. In this example, the UE may combine the DCI 510 from each CORESET 500A, 500B to improve coverage. In another configuration, as shown in FIG. 5B, the DCI 510 is transmitted on a subset of CORESETS 500A, 500B from the multiple CORESETS 500A, 500B. In the example of FIG. 5B, the DCI 510 is only transmitted on a first CORESET 500A. In this example, the second CORESET 500B may transmit a PDCCH including a DCI (not shown in FIG. 5B) for another UE. In the example of FIG. 5B, coverage may be enhanced by transmitting each CORESET 500A, 500B on a narrow beam 502. The narrow beam 502 may increase signal strength. In one configuration, the UE may attempt multiple hypotheses to identify the DCI 510 intended for the UE.

As previously described, an SSB may be mapped to one or more CORESETS. For example, as shown in FIGS. 4A, 4B, 5A, and 5B, each SSB may be mapped to two CORE-SETS. According to aspects of the present disclosure, the UE determines whether the SSB beam is mapped to one or more CORESETS based on an explicit or implicit indication. In one configuration, one or more new bits and/or one or more reserved bits of a MIB of the PBCH may explicitly indicate whether the SSB beam is mapped to one or more CORESETS.

In another configuration, one or more specific carrier frequencies (e.g., SSB raster) may be an implicit indication of a number of CORESETS mapped to an SSB. For example, the UE may acquire a specified carrier frequency and determine a one-to-many SSB-to-CORESET mapping based on acquiring the specified carrier frequency. In another configuration, different PSS and SSS sequences may indicate whether the SSB beam is mapped to one or more CORESETS. For example, a first PSS and SSS sequence may indicate that multiple CORESETS are mapped to an SSB. In this example, a second PSS and SSS sequence may indicate that only one CORESET is mapped to an SSB. In yet another configuration, reserved bits in a controlResourceSetZero field of the MIB may indicate whether the SSB beam is mapped to one or more CORESETS. For example, a number of {SS/PBCH block, PDCCH} SCS combinations, such as {120, 120} kHz, {240, 60} kHz, and {240, 120} kHz, use three out of four bits. In these examples, for at least 3GPP Release 16, a most significant bit (MSB) for controlResourceSetZero is set to zero. Therefore, in one configuration, the bit for the MSB of controlResourceSetZero may indicate whether a one-to-many mapping is supported. In one configuration, the use of the MSB is limited to UEs operating on Release 16 and beyond.

In another aspect of the present disclosure, a configuration of the multiple CORESETS may be specified relative to a single CORESET. That is, each CORESET of the multiple CORESETS may be transmitted at a predefined schedule relative to a single CORESET. For example, each CORESET may be consecutively transmitted after an initial CORESET. As another example, a symbol may separate each CORESET transmission after an initial CORESET.

Figure 6:
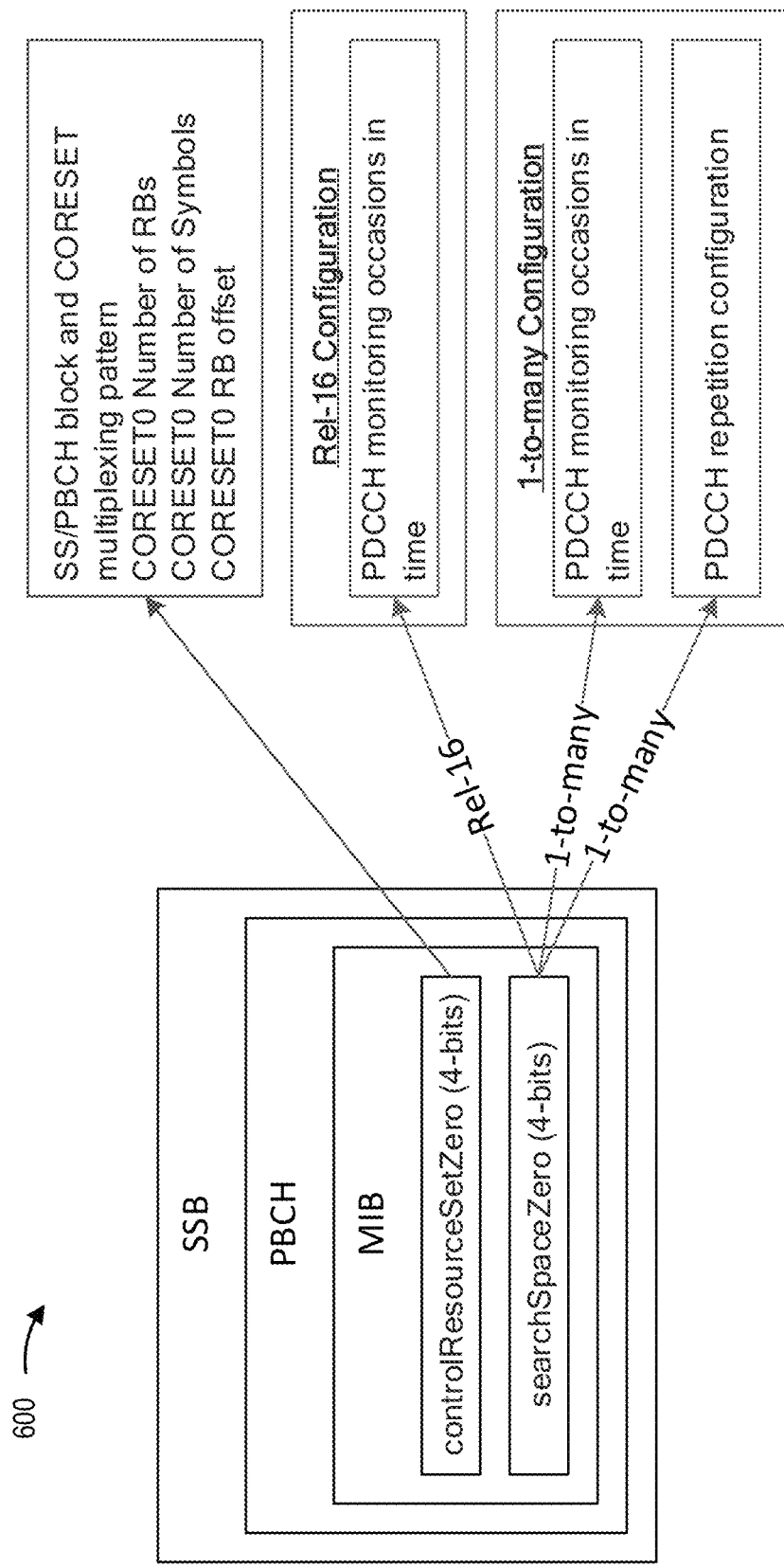
FIG. 6 is a block diagram illustrating an example of a new table for configuring multiple CORESETS, in accordance with aspects of the present disclosure.

In another aspect of the present disclosure, the configuration of the multiple CORESETS may be may be based on a new table. FIG. 6 is a block diagram illustrating an example of a new table 600 for configuring multiple CORE-SETS, in accordance with aspects of the present disclosure. As shown in FIG. 6, a MIB of a PBCH includes four bits for a controlResourceSetZero element and four bits for a searchSpaceZero element. The four bits for the controlResourceSetZero element may indicate a CORESET multiplexing pattern, a number of RBs specified for the CORESET, a number of symbols specified for the CORESET, and a resource block (RB) offset specified for the CORESET. Additionally, as shown in FIG. 6, if a single CORESET maps to an SSB, the four bits for the searchSpaceZero element correspond to a first table (shown as Rel-16 Configuration). Alternatively, if two or more CORESETS map to an SSB, the four bits for the searchSpaceZero element correspond to a second table (shown as 1-to-many Configuration). The second table may indicate a time for monitoring a PDCCH and a PDCCH repetition configuration. As previously described, the UE may determine whether two or more CORESETS are mapped to an SSB based on an explicit or implicit indication. The UE may also determine the appropriate table (e.g., first table or second table) in the MIB based on the explicit or implicit indication.

Figure 7A:
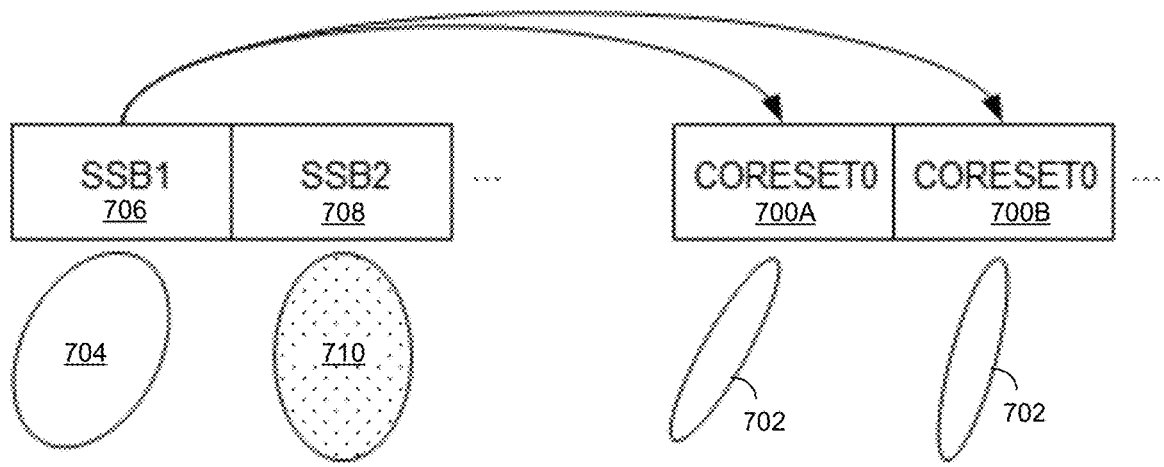
FIGS. 7A and 7B are block diagrams illustrating examples of consecutive CORESETS, in accordance with aspects of the present disclosure.

In a further aspect of the present disclosure, the multiple CORESET occasions may be consecutive or interleaved with a physical downlink shared channel (PDSCH). FIG. 7A is a diagram illustrating an example of consecutive CORESETS 700A, 700B, in accordance with aspects of the present disclosure. In the current example, each CORESET 700A, 700B is transmitted on a beam 702 that is different from a beam 704 of an SSB 706, as described with reference to FIG. 4B. As shown in FIG. 7A, the CORESETS 700A, 700B may be transmitted in consecutive order. That is, a first CORESET 700A may be followed by a second CORESET 700B. Additional CORESETS (not shown in FIG. 7A) may be consecutively transmitted after the second CORESET 700B.

Figure 7B:
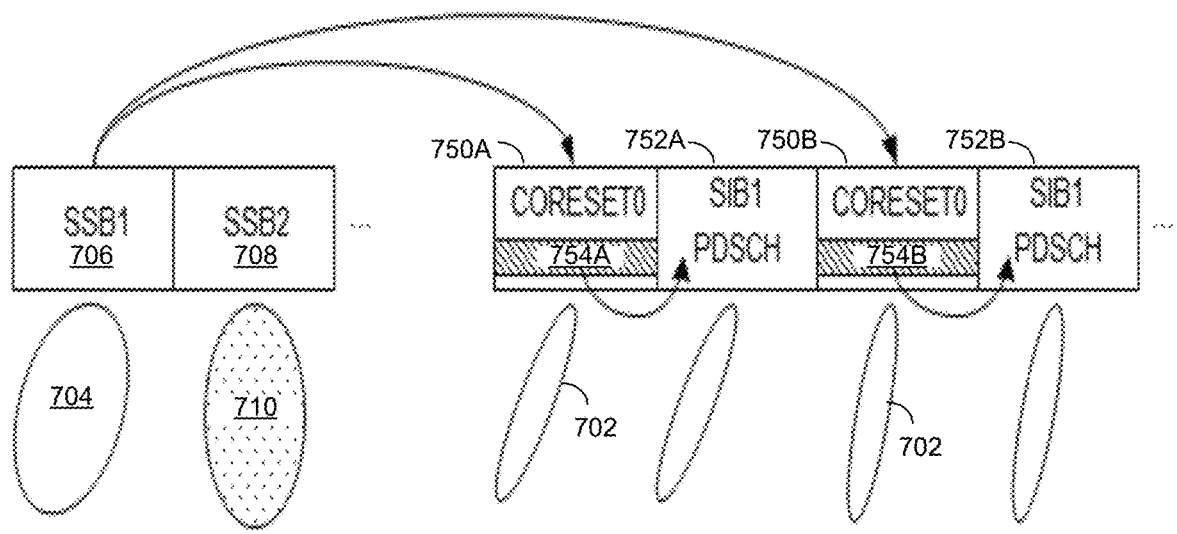

FIG. 7B is a diagram illustrating an example of consecutive CORESETS 750A, 750B, in accordance with aspects of the present disclosure. In the current example, the CORESETS 750A, 750B are transmitted on a beam 702 that is different from a beam 704 of an SSB 706, as described with reference to FIG. 4B. As shown in FIG. 7B, the CORESETS 750A, 750B may be interleaved with corresponding PDSCHs 752A, 752B. For example, a first CORESET 750A may include a first DCI 754A (e.g., DCI 1_0) scheduling a first SIB (e.g., SIB1) on a first PDSCH 752A and a second CORESET 750B may include a second DCI 754B (e.g., DCI 1_0) scheduling a second SIB (e.g., SIB1) on a second PDSCH 752B. The first PDSCH 752A may correspond to the first CORESET 750A, and the second PDSCH 752B may correspond to the second PDSCH 752B. As described, each PDSCH 752A, 752B may transmit a SIB, such as SIB 1.

In the examples of FIGS. 7A and 7B, a second SSB 708 (SSB2) may be transmitted via a corresponding beam 710. The corresponding beam 710 of the second SSB 708 (SSB2) may be different from the beam 704 of the first SSB 706 (SSB1).

Figure 8A:
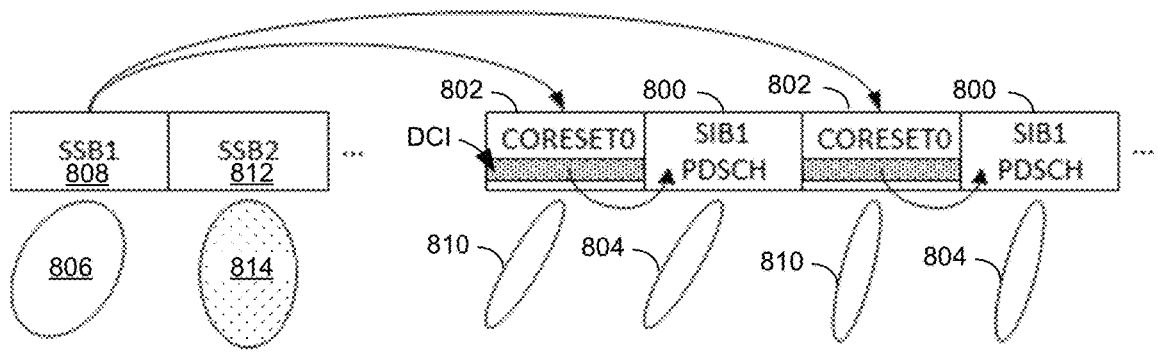
FIGS. 8A and 8B are block diagrams illustrating examples of transmitting physical downlink shared channels (PDSCHs), in accordance with aspects of the present disclosure.

In another aspect of the present disclosure, a number of PDSCH transmissions may be equal to or less than a number of CORESETS. FIG. 8A is a diagram illustrating an example of transmitting PDSCHs 800, in accordance with aspects of the present disclosure. As shown in FIG. 8A, the PDSCHs 800 may be interleaved with corresponding CORESETS 802, as described with reference to FIG. 7B. In the example of FIG. 8A, a beam 804 of each PDSCH 800 may be different from a beam 806 of a corresponding SSB 808. In one configuration, the beam 804 of each PDSCH 800 may be narrower than the beam 806 of each SSB 808. That is, the beam 804 of each PDSCH 800 may be a sub-beam of the beam 806 of the corresponding SSB 808. In this configuration, the beam 804 of each PDSCH 800 may be the same as a beam 810 of each CORESET 802 if the beam 810 of each CORESET 802 is a narrow beam. In the example of FIG. 8A, each PDSCH 800 may be quasi co-located (QCL'd) with a corresponding CORESET 802.

Figure 8B:
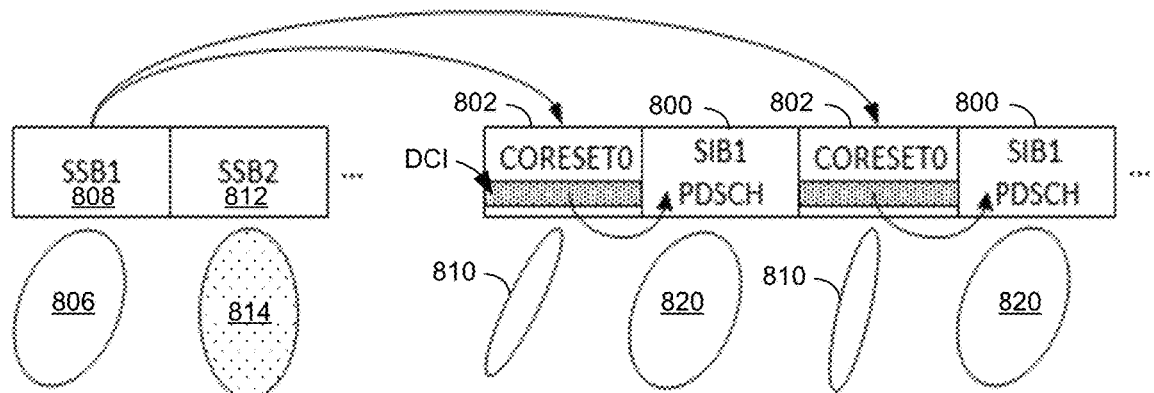

FIG. 8B is a diagram illustrating an example of transmitting PDSCHs 800, in accordance with aspects of the present disclosure. As shown in FIG. 8B, the PDSCHs 800 may be interleaved with corresponding CORESETS 802, as described with reference to FIG. 7B. In the example of FIG. 8B, a beam 820 of each PDSCH 800 may be the same as a beam 806 of each SSB 808. That is, the beam 820 of each PDSCH 800 may be a wide beam. In this configuration, the beam 820 of each PDSCH 800 may be different than a beam 810 of each CORESET 802 if the beam 810 of each CORESET 802 is a narrow beam. In the example of FIG. 8B, each PDSCH 800 may be QCL'd with a corresponding CORESET 802.

Figure 8C:
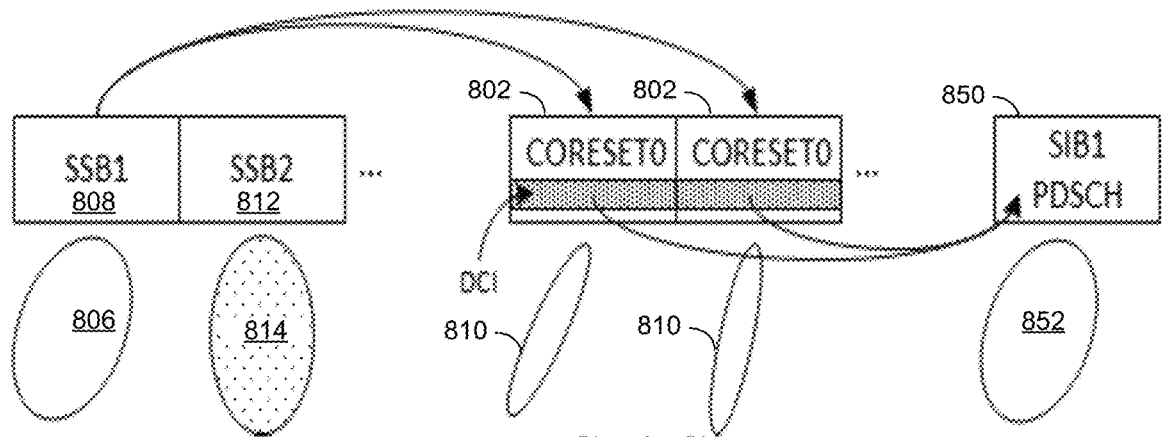
FIG. 8C is a block diagrams illustrating an example of transmitting a PDSCH, in accordance with aspects of the present disclosure.

FIG. 8C is a diagram illustrating an example of transmitting a PDSCH 850, in accordance with aspects of the present disclosure. In the example of FIG. 8C, the number of PDSCHs 850 is less than the number of CORESETS 802. That is, in one configuration, two or more CORESETS 802 may correspond to a single PDSCH 850. The single PDSCH 850 may be transmitted on a wide beam 852 and may be QCL'd with a corresponding SSB 808. In this configuration, the wide beam 852 of the PDSCH 850 may be different than a beam 810 of each CORESET 802 if the beam 810 of each CORESET 802 is a narrow beam.

In the examples of FIGS. 8A, 8B, and 8C, a second SSB 812 (SSB2) may be transmitted via a corresponding beam 814. The corresponding beam 814 of the second SSB 812 (SSB2) may be different from the beam 806 of the first SSB 808 (SSB1).

As indicated above, FIGS. 3-8C are provided as examples. Other examples may differ from what is described with respect to FIGS. 3-8C.

Figure 9:
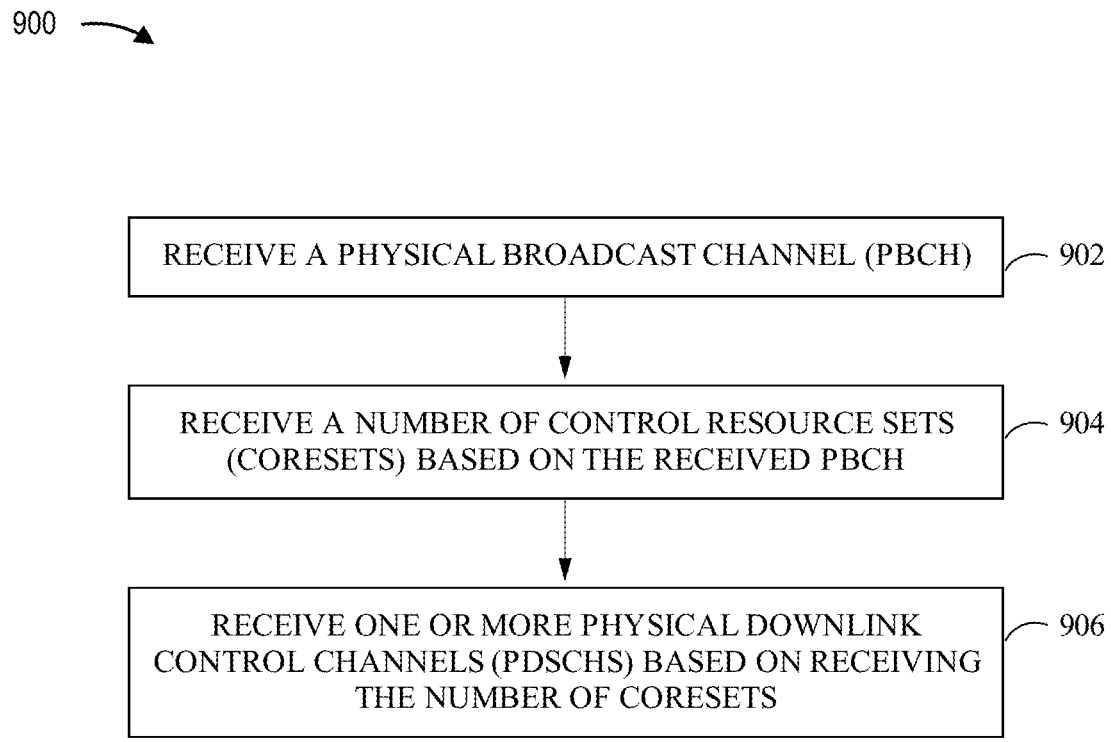
FIG. 9 is a flow diagram illustrating an example process performed, for example, by a user equipment (UE), in accordance with various aspects of the present disclosure.

FIG. 9 is a diagram illustrating an example process 900 performed, for example, by a UE, in accordance with various aspects of the present disclosure. The example process 900 is an example of receiving one or more control resource sets (CORESETS) based on a received physical broadcast channel (PBCH).

As shown in FIG. 9, at block 902, the UE receives a physical broadcast channel (PBCH). For example, the UE (e.g., using the antenna 252, MOD/DEMOD 254, receive processor 258, controller/processor 280, memory 282, and or the like) can receive the PBCH. At block 904, the UE receives a number of CORESETS based on the received PBCH. For example, the UE (e.g., using the antenna 252, MOD/DEMOD 254, receive processor 258, controller/processor 280, memory 282, and or the like) can receive the number of CORESETS. At block 906, the UE receives one or more physical downlink shared channels (PDSCHs) based on receiving the number of CORESETS. For example, the UE (e.g., using the antenna 252, MOD/DEMOD 254, receive processor 258, controller/processor 280, memory 282, and or the like) can receive one or more PDSCHs.

Implementation examples are described in the following numbered clauses:

1. A method for wireless communication performed by a user equipment (UE), comprising:
   receiving a physical broadcast channel (PBCH);
   receiving a plurality of control resource sets (CORESETS) based on the received PBCH; and
   receiving at least one physical downlink control channel (PDSCH) based on receiving the plurality of CORESETS.
2. The method of clause 1, further comprising identifying a location of a search space for each of the plurality of CORESETS based on the received PBCH.
3. The method of any of clauses 1-2, in which the PBCH identifies a search space location for each one of the plurality of CORESETS.
4. The method of any of clauses 1-3, in which:
   receiving the PBCH comprises receiving a synchronized signal block (SSB);
   receiving the plurality of CORESETS comprises receiving each CORESET via a wide beam or a narrow beam; and
   each CORESET is quasi co-located with the SSB.

5. The method of any of clauses 1-4, further comprising determining the SSB is mapped to the plurality of CORESETS based on at least one bit of a master information block (MIB) of the PBCH, a carrier frequency, or a synchronization signal sequence.
6. The method of any of clauses 1-5, further comprising decoding downlink control information (DCI) received via one of the plurality of CORESETS, the DCI repeated in each one of the plurality of CORESETS or a subset of the plurality of CORESETS.
7. The method of clause 6, further comprising scheduling the at least one PDSCH based on the DCI.
8. The method of any of clauses 1-7, in which the plurality of CORESETS are configured relative to an initial CORESET or based on a configuration table of a master information block (MIB) of the PBCH.
9. The method of clause of any of clauses 1-8, in which the plurality of CORESETS are consecutive.
10. The method of clause of any of clauses 1-8, in which the plurality of CORESETS are interleaved with the at least one PDSCH.
11. The method of clause of any of clauses 1-10, in which the at least one PDSCH comprises a system information block.
12. The method of clause of any of clauses 1-11, in which each PDSCH of the at least one PDSCH corresponds to one of the plurality of CORESETS, each PDSCH is quasi co-located with the corresponding one of the plurality of CORESETS, and receiving the at least one PDSCH comprises receiving each PDSCH via a wide beam or a narrow beam.
13. The method of any of clauses 1-11, in which each PDSCH of the at least one PDSCH corresponds to at least two CORESETS of the plurality of CORESETS, each PDSCH is quasi co-located with a synchronized signal block (SSB) corresponding to at least two CORESETS; and receiving the at least one PDSCH comprises receiving each PDSCH via a wide beam.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a user equipment (UE), comprising:
   receiving a physical broadcast channel (PBCH) via a wide beam;
   receiving a plurality of control resource sets (CORESETS) in accordance with receiving the PBCH, each CORESET of the plurality of CORESETS being associated with a different occasion of a single type of CORESET, each one of the plurality of CORESETS being received via a narrow beam; and
   receiving at least one physical downlink shared channel (PDSCH) in accordance with receiving the plurality of CORESETS, each PDSCH of the at least one PDSCH corresponding to at least two CORESETS of the plurality of CORESETS, each PDSCH being quasi co-located with a synchronized signal block (SSB) corresponding to the at least two CORESETS.

2. The method of claim 1, further comprising identifying a respective search space location for each of the plurality of CORESETS in accordance with receiving the PBCH.

3. The method of claim 1, wherein the PBCH identifies a search space location for each one of the plurality of CORESETS.

4. The method of claim 1, wherein:
   receiving the PBCH comprises receiving a synchronized signal block (SSB);
   and
   each CORESET is quasi co-located with the SSB.

5. The method of claim 4, further comprising determining the SSB is mapped to the plurality of CORESETS in accordance with at least one bit of a master information block (MIB) of the PBCH, a carrier frequency, or a synchronization signal sequence.

6. The method of claim 1, further comprising decoding downlink control information (DCI) received via one of the plurality of CORESETS, the DCI being repeated in each one of the plurality of CORESETS or a subset of the plurality of CORESETS.

7. The method of claim 6, further comprising scheduling the at least one PDSCH in accordance with decoding the DCI.

8. The method of claim 1, wherein the plurality of CORESETS are configured relative to an initial CORESET or in accordance with a configuration table of a master information block (MIB) of the PBCH.

9. The method of claim 1, wherein the plurality of CORESETS are consecutive.

10. The method of claim 1, wherein the plurality of CORESETS are interleaved with the at least one PDSCH.

11. The method of claim 1, wherein the at least one PDSCH comprises a system information block.

12. The method of claim 1, wherein:
receiving the at least one PDSCH comprises receiving each PDSCH via the wide beam or the narrow beam.

13. An apparatus for wireless communications at a user equipment (UE), comprising:
one or more processors;
a memory coupled with the one or more processors; and
instructions stored in the memory and operable, when executed by the one or more processors, to cause the apparatus to:
receive a physical broadcast channel (PBCH) via a wide beam;
receive a plurality of control resource sets (CORESETS) in accordance with receiving the PBCH, each CORESET of the plurality of CORESETS being associated with a different occasion of a single type of CORESET, each one of the plurality of CORESETS being received via a narrow beam; and
receive at least one physical downlink shared channel (PDSCH) in accordance with receiving the plurality of CORESETS, each PDSCH of the at least one PDSCH corresponding to at least two CORESETS of the plurality of CORESETS, each PDSCH being quasi co-located with a synchronized signal block (SSB) corresponding to the at least two CORESETS.

14. The apparatus of claim 13, wherein execution of the instructions further cause the apparatus to identify a respective search space location for each of the plurality of CORESETS in accordance with receiving the PBCH.

15. The apparatus of claim 13, wherein the PBCH identifies a search space location for each one of the plurality of CORESETS.

16. The apparatus of claim 13, wherein:
execution of the instructions further cause the apparatus to receive a synchronized signal block (SSB) in accordance with receiving the PBCH; and
each CORESET is quasi co-located with the SSB.

17. The apparatus of claim 16, wherein execution of the instructions further cause the apparatus to determine the SSB is mapped to the plurality of CORESETS in accordance with at least one bit of a master information block (MIB) of the PBCH, a carrier frequency, or a synchronization signal sequence.

18. The apparatus of claim 13, wherein execution of the instructions further cause the apparatus to decode downlink control information (DCI) received via one of the plurality of CORESETS, the DCI being repeated in each one of the plurality of CORESETS or a subset of the plurality of CORESETS.

19. The apparatus of claim 18, wherein execution of the instructions further cause the apparatus to schedule the at least one PDSCH in accordance with decoding the DCI.

20. The apparatus of claim 13, wherein the plurality of CORESETS are configured relative to an initial CORESET or in accordance with a configuration table of a master information block (MIB) of the PBCH.

21. The apparatus of claim 13, wherein the plurality of CORESETS are consecutive.

22. The apparatus of claim 13, wherein the plurality of CORESETS are interleaved with the at least one PDSCH.

23. The apparatus of claim 13, wherein the at least one PDSCH comprises a system information block.

24. The apparatus of claim 13, wherein:
execution of the instructions further cause the apparatus to receive each PDSCH via the wide beam or the narrow beam.

25. An apparatus for wireless communications at a user equipment (UE), comprising:
means for receiving a physical broadcast channel (PBCH) via a wide beam;
means for receiving a plurality of control resource sets (CORESETS) in accordance with receiving the PBCH, each CORESET of the plurality of CORESETS being associated with a different occasion of a single type of CORESET, each one of the plurality of CORESETS being received via a narrow beam; and
means for receiving at least one physical downlink shared channel (PDSCH) in accordance with receiving the plurality of CORESETS, each PDSCH of the at least one PDSCH corresponding to at least two CORESETS of the plurality of CORESETS, each PDSCH being quasi co-located with a synchronized signal block (SSB) corresponding to the at least two CORESETS.

26. The apparatus of claim 25, wherein a respective search space location for each of the plurality of CORESETS is identified in accordance with receiving the PBCH.

27. The apparatus of claim 25, wherein the PBCH identifies a search space location for each one of the plurality of CORESETS.

28. The apparatus of claim 25, wherein:
the means for receiving the PBCH comprises means for receiving a synchronized signal block (SSB); and
each CORESET is quasi co-located with the SSB.

29. The apparatus of claim 28, wherein a mapping of the SSB to the plurality of CORESETS is determined in accordance with at least one bit of a master information block (MIB) of the PBCH, a carrier frequency, or a synchronization signal sequence.

30. The apparatus of claim 25, wherein downlink control information (DCI) received via one of the plurality of CORESETS is decoded in accordance with receiving the plurality of CORESETS via the means for receiving the plurality of CORESETS, the DCI being repeated in each one of the plurality of CORESETS or a subset of the plurality of CORESETS.

31. The apparatus of claim 30, wherein the at least one PDSCH is scheduled in accordance with decoding the DCI.

32. The apparatus of claim 25, wherein the plurality of CORESETS are configured relative to an initial CORESET or in accordance with a configuration table of a master information block (MIB) of the PBCH.

33. The apparatus of claim 25, wherein the plurality of CORESETS are consecutive.

34. The apparatus of claim 25, wherein the plurality of CORESETS are interleaved with the at least one PDSCH.

35. The apparatus of claim 25, wherein the at least one PDSCH comprises a system information block.

36. The apparatus of claim 25, wherein:
the means for receiving the at least one PDSCH comprises means for receiving each PDSCH via the wide beam or the narrow beam.

37. A non-transitory computer-readable medium having program code recorded thereon for wireless communication, the program code executed by one or more processors and comprising:
  program code to receive a physical broadcast channel (PBCH) via a wide beam;
  program code to receive a plurality of control resource sets (CORESETS) in accordance with receiving the PBCH, each CORESET of the plurality of CORESETS being associated with a different occasion of a single type of CORESET, each one of the plurality of CORESETS being received via a narrow beam; and
  program code to receive at least one physical downlink shared channel (PDSCH) in accordance with receiving the plurality of CORESETS, each PDSCH of the at least one PDSCH corresponding to at least two CORESETS of the plurality of CORESETS, each PDSCH being quasi co-located with a synchronized signal block (SSB) corresponding to the at least two CORESETS.

38. The non-transitory computer-readable medium of claim 37, further comprising program code for identifying a respective search space location for each of the plurality of CORESETS in accordance with receiving the PBCH.

39. The non-transitory computer-readable medium of claim 37, wherein the PBCH identifies a search space location for each one of the plurality of CORESETS.

40. The non-transitory computer-readable medium of claim 37, further comprising program code for determining the SSB is mapped to the plurality of CORESETS in accordance with at least one bit of a master information block (MIB) of the PBCH, a carrier frequency, or a synchronization signal sequence.

* * * * *